United States Patent [19]
Sokol, Jr. et al.

[11] Patent Number: 6,124,017
[45] Date of Patent: Sep. 26, 2000

[54] CORNER REINFORCEMENT STRUCTURE FOR CLOTH

[75] Inventors: James J. Sokol, Jr., Brea, Calif.; S. K. Kim, Seoul, Rep. of Korea

[73] Assignee: Serville Classics, Inc., Los Angeles, Calif.

[21] Appl. No.: 09/259,838

[22] Filed: Mar. 1, 1999

[51] Int. Cl.[7] ........................................... B32B 3/10
[52] U.S. Cl. ........................ 428/99; 428/80; 428/137
[58] Field of Search .................... 428/80, 81, 99, 428/137; 135/119

[56] References Cited

U.S. PATENT DOCUMENTS

| | | |
|---|---|---|
| 1,598,127 | 8/1926 | Fleming . |
| 4,777,071 | 10/1988 | Liu ............................................. 428/120 |
| 4,906,503 | 3/1990 | De La Cruz et al. ..................... 428/81 |
| 5,415,915 | 5/1995 | Oh ............................................. 428/99 |
| 5,424,107 | 6/1995 | Lee ............................................ 428/80 |
| 5,512,347 | 4/1996 | Chu ........................................... 428/81 |

*Primary Examiner*—Alexander S. Thomas
*Attorney, Agent, or Firm*—Raymond Sun

[57] ABSTRACT

A corner reinforcement structure for reinforcing the corner of a cloth article is provided. The reinforcement structure has a body that includes a first plate and a second plate that are secured together. Each plate has an outer edge at which the first plate and second plate are connected, an inner edge, and at least two openings for receiving a cord. The inner edge of each plate defines a slit for allowing a cloth article to be inserted therethrough.

19 Claims, 3 Drawing Sheets

CORNER REINFORCEMENT STRUCTURE FOR CLOTH

BACKGROUND OF THE INVENTION

1. Field of the Invention

The present invention relates in general to a reinforcement for cloth, and in particular, to a corner reinforcement structure for cloth which enables the cloth corner to endure the dragging force coming from a cord attached thereto and tied to a support, thereby prolonging the life of the cloth.

2. Description of the Prior Art

Cloth has many uses and applications. For example, plastic cloth, woven cloth, and canvas can be used to make various camping equipment, such as tents, shade structures, awnings, or other equipment to provide shade, protection from rain, wind and the elements. However, cloth that is textured with warp and weft is susceptible to unravelling in the corners of the cloth.

There are a number of prior art attempts to provide structures to reinforce corners of cloth. Unfortunately, these approaches offer only tolerable solutions, are deficient in certain respects, and have the following disadvantages. First, many prior art reinforcement structures provide only a single hole for cord attachment. By offering only a single cord attachment hole, these structures limit the flexibility and options available to a user of the cloth. For example, in certain applications, where the cloth is lightweight, and the cloth has a relatively small surface area (e.g., a small two-man tent), it may be tolerable to have a single attachment hole. However, there are many other applications where the user may desire or require (i) greater flexibility in coupling the cord to the cloth, (ii) greater support, or (iii) a more even distribution of stress along the cloth, among others. For example, greater flexibility may be needed when the cloth is heavy, has a large surface area (e.g., heavy awning, large tents, or other shade device) or where the support to which a cord is secured is located in an inconvenient location or is otherwise limited in a certain manner.

The single attachment hole also raises a reliability issue. In certain prior art structures, should the attachment hole become damaged or torn for some reason (or for that matter, should the cord or support fail for some reason), the corresponding corner of the cloth will become unsupported without any back-up option, which can lead to collapse of the tent or other structure of which the cloth is a component.

Second, many prior art structures employ rivets, plugs, and other fasteners to attach the structure to the cloth. Unfortunately, these fasteners damage the cloth and have a small contact area, thereby reducing the ability of the structure to effectively grip the cloth and thereby requiring a larger number of these fasteners in addition to other mechanisms for accomplishing this same purpose.

Consequently, there remains a need for a corner reinforcement structure for cloth which enables the cloth corner to endure the dragging force coming from a cord attached thereto, which prolongs the life of the cloth, and which overcomes one or more of the disadvantages of existing reinforcement structures discussed previously.

SUMMARY OF THE DISCLOSURE

Accordingly, it is an object of the present invention to provide a corner reinforcement structure that reinforces a corner of a cloth article and that increases the useful life of cloth with stability and security.

It is another object of the present invention to provide a corner reinforcement structure for reinforcing the corner of cloth that allows the cloth to be easily adjusted into position in the reinforcement structure.

It is yet another object of the present invention to provide a corner reinforcement structure for reinforcing the corner of cloth that provides at least two annular openings so that a cord can be flexibly attached to one or more of the openings to suit a particular application.

In order to accomplish the objects of the present invention, a corner reinforcement structure for reinforcing the corner of a cloth article is provided. The reinforcement structure according to the present invention has a body that includes a first plate and a second plate that are secured together. Each plate has an outer edge at which the first plate and second plate are connected, an inner edge, and at least two openings for receiving a cord. The inner edge of each plate defines a slit for allowing a cloth article to be inserted therethrough.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

For purposes of the present invention, the term "cloth" is used in a generic sense, and is intended to include all types of cloth, fabric, polyethylene, linen, nylon, and the like, including materials that are woven, unwoven, spun and molded.

Figure 1:
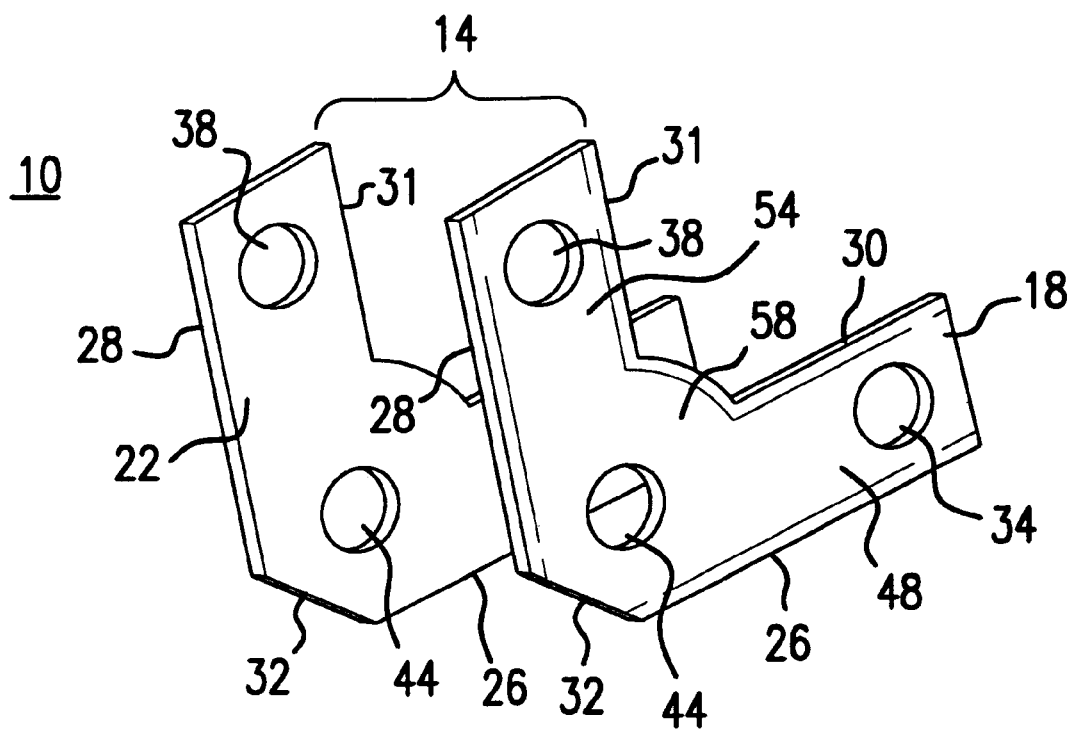
FIG. 1 is an exploded perspective view of a corner reinforcement structure according to a first embodiment of the present invention.

FIG. 1 is an exploded perspective view of a corner reinforcement structure 10 according to a first embodiment of the present invention. Structure 10 has a body 14 that includes a first plate 18 and a second plate 22. Each plate 18 and 22 has two outer edges 26 and 28 that are positioned generally perpendicular to each other. The outer edges 26, 28 also connect the first plate 18 with the second plate 22, and can have thickened portions to strengthen this connection. The outer edges 26, 28 of each plate 18 and 22 can be connected in a number of ways. For example, the structure 10 can be provided in a manner such that first and second plates 18, 22 are formed as one integral piece so that the plates 18, 22 are provided with the outer edges 26, 28 already connected. Alternatively, the outer edges 26, 28 of the plates 18, 22 can be connected by gluing, heat sealing, riveting, stitching or other similar methods.

Each plate 18 and 22 also has two inner edges 30 and 31 that together define a first slit for allowing a cloth article (which is described in greater detail with reference to FIG. 2) to be positioned inside the structure 10. Each plate 18 and 22 further includes a connecting edge 32 that connects the outer edges 26 and 28 of each plate 18 and 22, and which together define a second slit that allows the tip of the corner of the cloth article to extend out of structure 10 for further ease in positioning of cloth 10 in structure 10.

At least two openings are formed in the first plate 18 and the second plate 22. In the embodiment of FIG. 1, three openings, a first opening 34, a second opening 38, and a third opening 44, are formed in the first plate 18 and the second plate 22. The openings 34, 38, 44 are adapted to receive a cord, rope or other attachment device for securing the cloth to a support (such as a pole or peg).

In the first embodiment shown in FIG. 1, the body 14 has a generally L-shaped configuration with a first leg portion 48, a second leg portion 54 generally perpendicular to the first leg portion 48, and a middle portion 58 connecting the first and second leg portions 48 and 54. The first opening 34 is positioned in the first leg portion 48, the second opening 38 is positioned in the second leg portion 53, and the third opening 44 is positioned in the middle portion 58.

The plates 18 and 22 of the body 14 are preferably made from a tough, yet flexible, plastic material that can be formed by a single injecting molding manufacturing process. Other materials that can be used for the plates 18, 22 include ABS, polypropylene, polyethylene and rubber.

Figure 2:
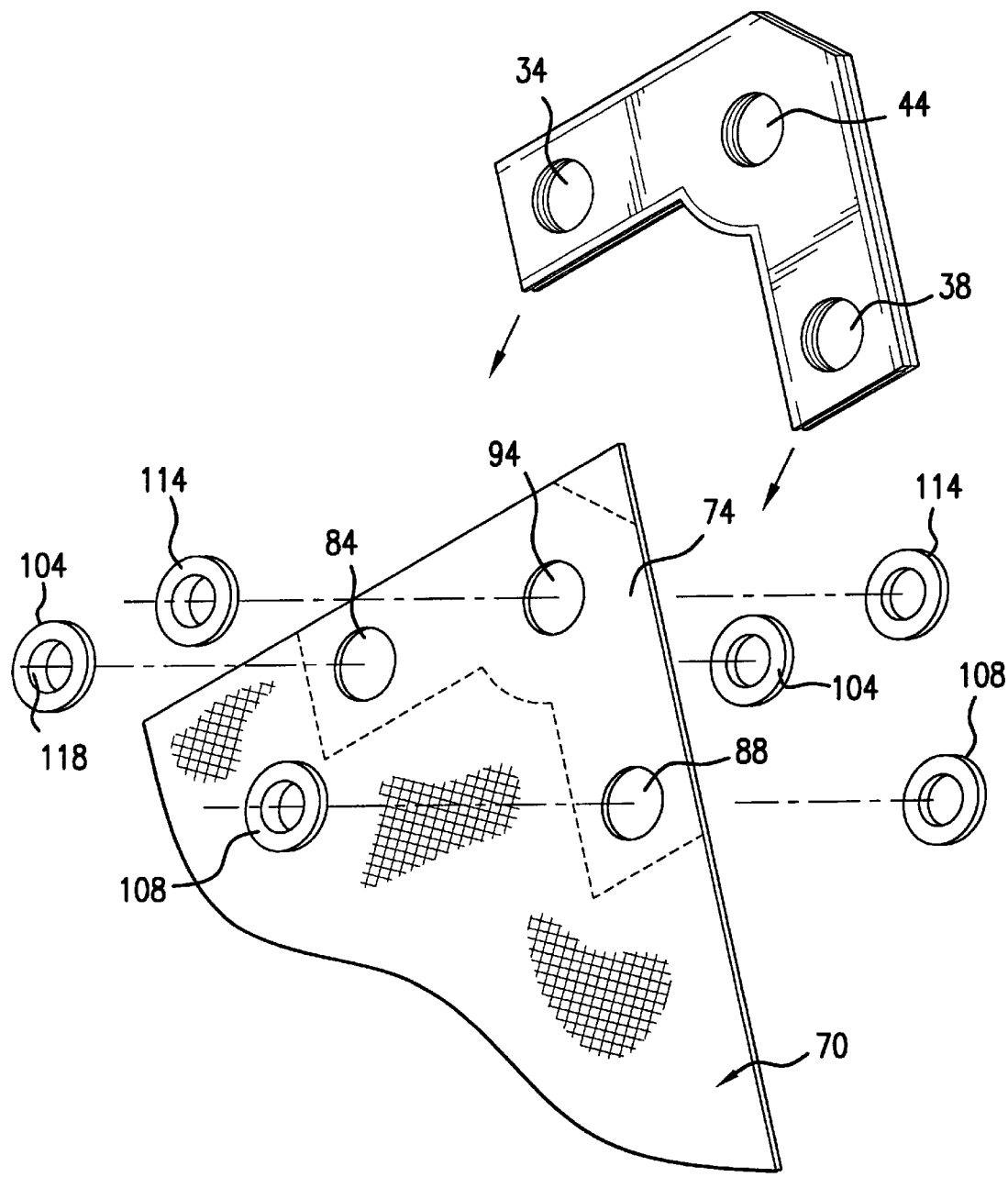
FIG. 2 is another exploded perspective view illustrating how the reinforcement structure of FIG. 1 is attached to an article of cloth.

FIG. 2 is a different exploded perspective view illustrating how the reinforcement structure 10 of FIG. 1 is attached to a cloth article 70 in the corner 74 thereof. To assemble the structure 10 with cloth article 70, a corner 74 of cloth article 70 is inserted through the slit defined by inner edges 30, 31 of the plates 18, 22, and then the slit defined by the connecting edges 32. The three openings 84, 88, 94 of cloth article 70 are then aligned with the three openings 34, 38, 44, respectively, of the plates 18, 22. Thereafter, one of each pair of first grommets 104, second grommets 108, and third grommets 114 is positioned over the openings 34, 38 and 44, respectively, on first plate 18, and the other of each pair of first grommets 104, second grommets 108, and third grommets 114 is positioned over the openings 34, 38 and 44, respectively, on second plate 22. The grommet pairs 104, 108, 114 are then fastened together (e.g., by machine-press or a similar force-applied technique) to secure the cloth article 70 to the structure 10.

The grommets 104, 108, 114 serve the dual purpose of protecting the openings 84, 88, 94 of the cloth 70 from force exerted by a cord attached thereto, and securing the structure 10 to the cloth article 70. In addition, by providing two or more openings and corresponding grommets, no separate securing mechanisms are needed to secure the structure 10 to cloth article 70. In other words, the use of rivets, studs, and other attachment devices are obviated by the present invention. As an option, each grommet 104, 108, 114 can include a lip 118 that cushions the dragging force that is applied by a cord attached to the opening 34, 38, 44. Accordingly, a dragging force that is applied by a cord attached to any opening 34, 38 or 44 that may be needed to form the inherent shape of the cloth 70 is not directly applied to the openings 84, 88, 94 of the cloth 70, but is cushioned by the lips 118. In this regard, any warp and weft of the cloth is not loosened in the corner, thereby extending the life of the cloth 70. Thus, an advantage of the structure 10 of the present invention is its capability to evenly distribute the dragging force and stably support the tensile strength of the cloth 70.

Figure 3:
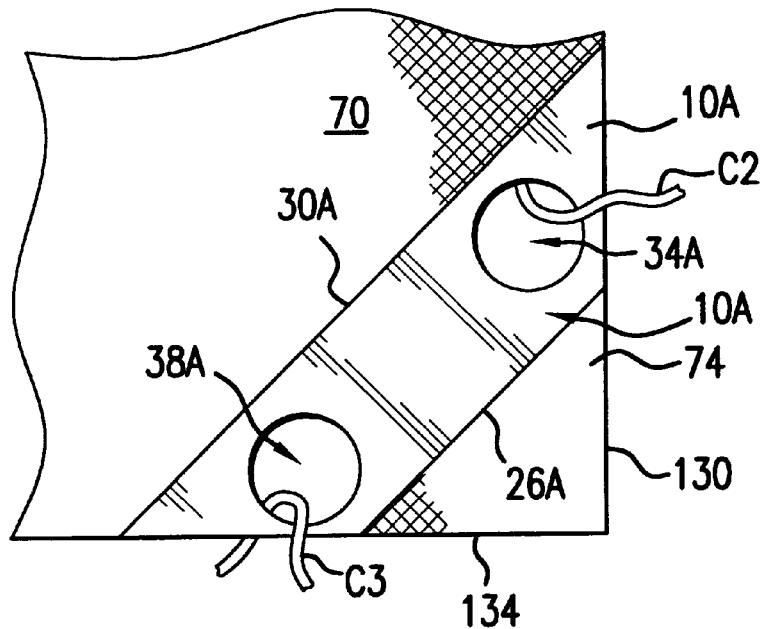
FIG. 3 is a top plan view of a corner reinforcement structure according to a second embodiment of the present invention.
Figure 4:
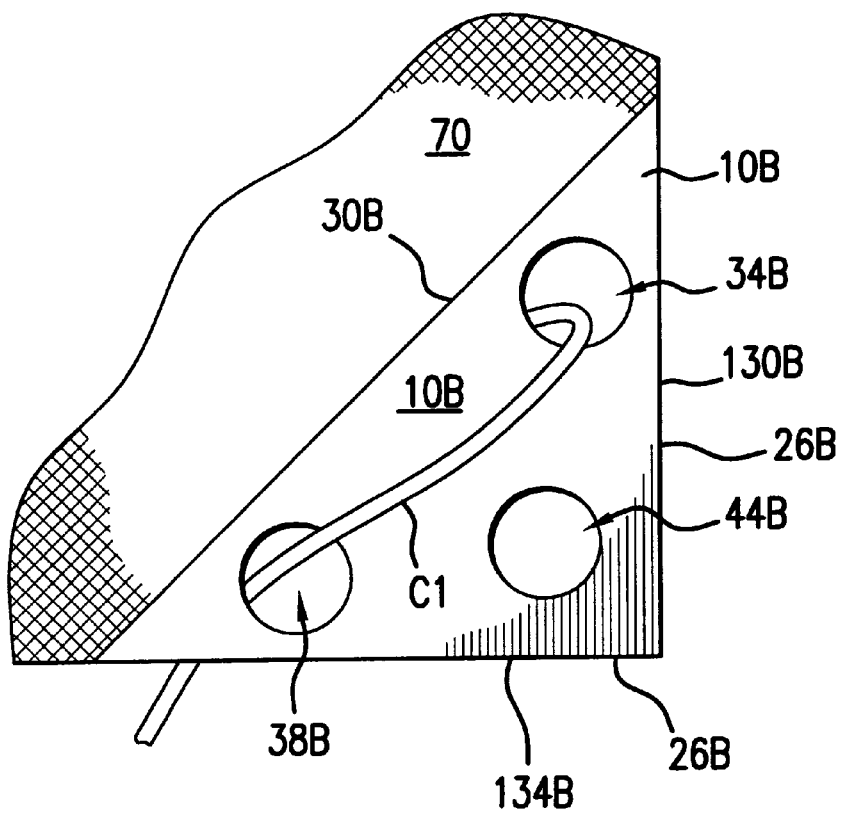
FIG. 4 is a top plan view of a corner reinforcement structure according to a third embodiment of the present invention.

FIGS. 3 and 4 illustrate two alternative corner reinforcement structures according to the present invention. The elements of the structures 10A and 10B in FIGS. 3 and 4, respectively, that are the same as the elements of the structure 10 are provided with the same numeral designations except that an "A" and a "B" have been added to the numeral designations in FIGS. 3 and 4, respectively.

FIG. 3 is a top plan view of a corner reinforcement structure 11A according to a second embodiment of the present invention. In the second embodiment, the structure 10A includes a body 14A that has a trapezoidal shape. Structure 10A provides a first opening 34A disposed at a first end along a first edge 130 of the cloth 70 and a second opening 38A disposed at a second end along a second edge 134 of the cloth 70. The main difference between this embodiment and the first embodiment is the different shape of the body and the absence of the third opening 44 adjacent the corner 74 of the cloth 70. Each plate 18A, 22A has one outer edge 26A and one inner edge 30A that are generally parallel to each other, with the outer edges 26A of the plates defining a first slit, and the inner edges 30A of the plates defining a second slit. The corner 74 of cloth article 70 is inserted through these two slits.

FIG. 4 is a top plan view of a corner reinforcement structure 10B according to a third embodiment of the present invention. In the third embodiment, the structure 10B includes a body 14B that has a generally triangular shape. Structure 10B provides a first opening 34B disposed along a first edge 130B, a second opening 38B disposed along a second edge 134B of the cloth 70, and a third opening 44B disposed adjacent the corner 74 of cloth article 70. The main difference between this embodiment and the first embodiment is the different shape of the body 14B (i.e., a generally triangular shape versus an L-shape of the first embodiment). Each plate 18B, 22B has two perpendicular outer edge 26B (with no connecting edge 32) and one inner edge 30B that essentially connects opposite ends of the outer edges 26B, with the inner edges 30B of the plates defining a slit, and with no slit being defined by the outer edges 26B. Thus, in this embodiment, the corner 74 of cloth article 70 is inserted through the slit defined by the inner edges 30B, and is retained between the plates 18B, 22B since there is no slit between the outer edges 26B.

The embodiments of FIGS. 3 and 4 can be assembled using the same method illustrated above for structure 10 in FIG. 1. Thus, as illustrated above, the present invention provides a reinforcement structure 10, 10A, 10B having at least two openings to allow a user to flexibly attach a cord to one or more of these openings to suit a particular application. For example, a user can thread a single cord (e.g., see cord C1 in FIG. 4) through both the first opening 34, 34A, 34B and the second opening 38, 38A, 38B and secure that cord to a support. It is understood that, depending on the number of openings provided in the reinforcement structure of the present invention, a single cord can be threaded through one or more of these openings. The advantage of threading a single cord through more than one of the openings is to more evenly distribute the force applied to any one opening, thereby increasing life of the cloth and decreasing wear of the cloth.

Alternatively, a user can thread a first cord (e.g., see cord C2 in FIG. 3) through the first opening 34, 34A, 34B and a second cord (e.g., see cord C3 in FIG. 3) through the second opening 38, 38A, 38B. The first and second cords can be secured to two different supports or the same support. It is understood that, depending on the number of openings provided in the reinforcement structure 10, 10A, 10B of the present invention, a separate cord can be threaded through each of these openings or a selected predetermined number of openings. The advantage of threading a separate cord through each corresponding opening is to provide a back-up in the event that either the cord or rope, corresponding to a particular opening, breaks, or the support to which the cord is fastened fails, or that particular opening tears or otherwise fails. This will improve the reliability and provide additional support.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A corner reinforcement structure for being secured to a cloth article, the reinforcement structure comprising a body having a first plate and a second plate, each plate having:

an outer edge at which the first plate and second plate are connected;

an inner edge;

at least two openings for receiving a cord;

wherein the inner edge of each plate together defines a slit for allowing a cloth article to be inserted therethrough; and wherein the reinforcement structure further includes a grommet positioned in each of said at least two openings.

2. The structure of claim 1, wherein each plate includes a third opening.

3. The structure of claim 2, further including a single cord threaded through the third opening.

4. The structure of claim 1, wherein the openings in the first and second plates are aligned with each other.

5. The structure of claim 1, wherein the body has an L-shaped configuration having a first leg portion, a second leg portion, and a middle portion, and wherein a first opening is positioned in the first leg portion and a second opening is positioned in the second leg portion.

6. The structure of claim 5, further including a grommet positioned in the first opening and the second opening, and wherein the grommets protect the openings from force exerted by a cord attached thereto and secure the structure to the cloth article.

7. The structure of claim 5, wherein each plate includes a third opening, and wherein the third opening is disposed in the middle portion.

8. The structure of claim 1, wherein each plate has two outer edges and a connecting edge, the outer edges separated and connected by the connecting edge, and wherein the connecting edges of each plate together define a slit for allowing a corner of a cloth article to be inserted therethrough.

9. The structure of claim 8, wherein the two outer edges of each plate are perpendicular to each other.

10. The structure of claim 1, wherein the body has a trapezoidal configuration having a first end and a second end, and wherein a first opening is positioned at the first end and a second opening is positioned at the second end.

11. The structure of claim 10, wherein the outer and inner edges of each plate are parallel to each other.

12. The structure of claim 1, wherein the body has a triangular configuration having two outer edges that are perpendicular to each other and connected to each other, and with the inner edge connected to the outer edges.

13. The structure of claim 1, wherein the outer edges include thickened portions to provide strength to the edges.

14. The structure of claim 1, wherein the body is integrally formed by an injection molding process.

15. The structure of claim 1, further including a single cord threaded through each of the at least two openings.

16. The structure of claim 1, further including a first cord threaded through one of the at least two openings and a second cord threaded through another of the at least two openings.

17. A corner reinforcement structure for being secured to a cloth article, the reinforcement structure comprising a body having a first plate and a second plate, each plate having:

an outer edge at which the first plate and second plate are connected;

an inner edge; and at least two openings for receiving a cord;

wherein the inner edge of each plate together defines a slit for allowing a cloth article to be inserted therethrough; and wherein the body has a trapezoidal configuration having a first end and a second end, and wherein a first opening is positioned at the first end and a second opening is positioned at the second end, with the outer and inner edges of each plate parallel to each other.

18. A corner reinforcement structure for being secured to a cloth article, the reinforcement structure comprising a body having a first plate and a second plate, each plate having:

an outer edge at which the first plate and second plate are connected;

an inner edge; and at least two openings for receiving a cord;

wherein the inner edge of each plate together defines a slit for allowing a cloth article to be inserted therethrough; and the reinforcement structure further including a single cord threaded through each of the at least two openings.

19. A corner reinforcement structure for being secured to a cloth article, the reinforcement structure comprising a body having a first plate and a second plate, each plate having:

an outer edge at which the first plate and second plate are connected;

an inner edge; and at least two openings for receiving a cord;

wherein the inner edge of each plate together defines a slit for allowing a cloth article to be inserted therethrough; and the reinforcement structure further including a first cord threaded through one of the at least two openings and a second cord threaded through another of the at least two openings.

* * * * *